United States Patent
Lee et al.

(10) Patent No.: US 11,695,147 B2
(45) Date of Patent: Jul. 4, 2023

(54) ANTIOXIDANT FOR ELECTROLYTE MEMBRANE OF FUEL CELL AND METHOD FOR PREPARING THE SAME

(71) Applicant: KOREA INSTITUTE OF SCIENCE AND TECHNOLOGY, Seoul (KR)

(72) Inventors: So Young Lee, Seoul (KR); Seung Ju Lee, Seoul (KR); Hyun Seo Park, Seoul (KR); Jin Young Kim, Seoul (KR); Sung Jong Yoo, Seoul (KR); Jong Hyun Jang, Seoul (KR); Hyoung-Juhn Kim, Seoul (KR); Hee-Young Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 302 days.

(21) Appl. No.: 17/013,918

(22) Filed: Sep. 8, 2020

(65) Prior Publication Data
US 2022/0021015 A1    Jan. 20, 2022

(30) Foreign Application Priority Data

Jul. 15, 2020 (KR) .......................... 10-2020-0087465

(51) Int. Cl.
*H01M 8/1051* (2016.01)
*H01M 8/1039* (2016.01)
(Continued)

(52) U.S. Cl.
CPC ......... *H01M 8/1051* (2013.01); *C08F 14/185* (2013.01); *C08K 3/32* (2013.01);
(Continued)

(58) Field of Classification Search
CPC ............. H01M 8/1051; H01M 8/1039; H01M 8/1081; H01M 8/1048; H01M 8/1074;
(Continued)

(56) References Cited

U.S. PATENT DOCUMENTS

2006/0199063 A1* 9/2006 Miura ................. H01M 8/1051
                                                     429/492
2012/0141919 A1* 6/2012 Lee ..................... H01M 4/8663
                                                     429/535

FOREIGN PATENT DOCUMENTS

JP    2005071760 A    3/2005
KR    10-1639536 B1    7/2016

OTHER PUBLICATIONS

S. K. Shakshooki et al., "Fibrous Cerium(iv) Hydrogen Phosphate Membrane Self Supported Benzimidazole Polymerization Agent", Advanced Materials Research vol. 856 (2014) pp. 3-8, Publication Date: Dec. 6, 2013.

* cited by examiner

*Primary Examiner* — Matthew W Van Oudenaren
(74) *Attorney, Agent, or Firm* — Rabin & Berdo, P.C.

(57) ABSTRACT

Disclosed is an antioxidant for a polymer electrolyte membrane of a fuel cell including cerium hydrogen phosphate (CeHPO$_4$). The presence of cerium hydrogen phosphate in the antioxidant enhances the dissolution stability of cerium and improves the ability to capture water, leading to an increase in proton conductivity. In addition, the cerium hydrogen phosphate has a crystal structure composed of smaller cerium particles. This crystal structure greatly improves the ability of the antioxidant to prevent oxidation of the electrolyte membrane. Also disclosed are an electrolyte membrane including the antioxidant, a fuel cell including the electrolyte membrane, a method for preparing the antioxidant, a method for producing the electrolyte membrane, and a method for fabricating the fuel cell.

13 Claims, 6 Drawing Sheets

(51) Int. Cl.
*C08K 3/32* (2006.01)
*C08K 7/08* (2006.01)
*C08F 14/18* (2006.01)
*H01M 8/10* (2016.01)

(52) U.S. Cl.
CPC ............ *C08K 7/08* (2013.01); *H01M 8/1039* (2013.01); *C08K 2003/328* (2013.01); *C08K 2201/003* (2013.01); *C08K 2201/011* (2013.01); *H01M 2008/1095* (2013.01); *H01M 2300/0082* (2013.01)

(58) Field of Classification Search
CPC . H01M 2008/1095; H01M 2300/0082; H01M 8/1046; H01M 8/1041; C08F 14/185; C08K 3/32; C08K 7/08; C08K 2003/328; C08K 2201/003; C08K 2201/011
See application file for complete search history.

[Comparative Example 1]

[Comparative Example 2]

[Example 3]

[Example 4]

ANTIOXIDANT FOR ELECTROLYTE MEMBRANE OF FUEL CELL AND METHOD FOR PREPARING THE SAME

CROSS-REFERENCE TO RELATED APPLICATIONS

This application claims priority under 35 U.S.C. § 119 to Korean Patent Application No. 10-2020-0087465 filed on Jul. 15, 2020 in the Korean Intellectual Property Office, the disclosure of which is incorporated herein by reference in its entirety.

BACKGROUND OF THE INVENTION

1. Field of the Invention

The present invention relates to an antioxidant for an electrolyte membrane of a fuel cell, an electrolyte membrane including the antioxidant, a fuel cell including the electrolyte membrane, a method for preparing the antioxidant, a method for producing the electrolyte membrane, and a method for fabricating the fuel cell. More specifically, the present invention relates to an antioxidant that can be loaded into an electrolyte membrane of a fuel cell to improve the durability and conductivity of the electrolyte membrane, an electrolyte membrane including the antioxidant, a fuel cell including the electrolyte membrane, a method for preparing the antioxidant, a method for producing the electrolyte membrane, and a method for fabricating the fuel cell.

2. Description of the Related Art

Polymer electrolyte membrane fuel cells (PEMFCs) are generally used for automotive applications. For high output performance of such polymer electrolyte membrane fuel cells, polymer electrolyte membranes should be able to stably operate over a wide range of current densities.

In a typical fuel cell, hydrogen and oxygen in air as reactant gases crossover through an electrolyte membrane to promote the production of hydrogen peroxide (HOOH). The hydrogen peroxide produces oxygen-containing radicals such as hydroxyl (OH) and hydroperoxyl (OOH) radicals. These radicals attack the perfluorosulfonated electrolyte membrane to cause chemical degradation of the membrane, resulting in poor durability of the fuel cell.

The addition of various types of antioxidants to electrolyte membranes have been proposed to mitigate chemical degradation of the electrolyte membranes. Such antioxidants can be classified into primary antioxidants functioning as radical scavengers or quenchers and secondary antioxidants functioning as hydrogen peroxide decomposers. Particularly, representative primary antioxidants include cerium-based antioxidants and terephthalate antioxidants.

Conventional antioxidants added to perfluorosulfonated ionomer electrolyte membranes react with sulfonic acid groups of the electrolyte membranes to decrease the proton conductivity of the electrolyte membranes, eventually resulting in a reduction in the power of fuel cell electric vehicles. Further, conventional antioxidants in the form of nanoparticles tend to aggregate, losing their dispersibility.

Thus, there is a need to develop an antioxidant that is highly dispersible and does not reduce the proton conductivity of an electrolyte membrane, ensuring high proton conductivity and good durability of the electrolyte membrane.

PRIOR ART DOCUMENTS

Patent Documents

Korean Patent Publication No. 10-2015-0182965

SUMMARY OF THE INVENTION

The present invention has been made in an effort to solve the above problems and one object of the present invention is to provide an antioxidant for a polymer electrolyte membrane of a fuel cell that is composed of a solid acid stable in a strongly acidic environment, is in the form of nanofibers, can be prepared in the form of a dispersion due to its high dispersibility, and can improve the mechanical strength and proton conductivity of the electrolyte membrane.

A further object of the present invention is to provide an electrolyte membrane including the antioxidant.

Another object of the present invention is to provide a fuel cell employing an electrolyte membrane in which the antioxidant is dispersed, achieving high output performance and ensuring stable operation over a wide range of current densities.

According to one aspect of the present invention, there is provided an antioxidant for a polymer electrolyte membrane of a fuel cell including cerium hydrogen phosphate ($CeHPO_4$).

The antioxidant may be a radical scavenger.

The cerium hydrogen phosphate ($CeHPO_4$) may be a solid acid.

The cerium hydrogen phosphate ($CeHPO_4$) may be in the form of nanofibers.

The nanofibers may have a diameter of 10 to 900 nm.

The antioxidant may be used for a fluorinated polymer electrolyte membrane.

The fluorinated polymer electrolyte membrane may be a perfluorosulfonated ionomer electrolyte membrane.

According to a further aspect of the present invention, there is provided a polymer electrolyte membrane for a fuel cell including a polymer electrolyte membrane and an antioxidant including cerium hydrogen phosphate ($CeHPO_4$) dispersed in the polymer electrolyte membrane.

The antioxidant may be a radical scavenger.

The cerium hydrogen phosphate ($CeHPO_4$) may be a solid acid.

The cerium hydrogen phosphate ($CeHPO_4$) may be in the form of nanofibers.

The nanofibers may have a diameter of 10 to 900 nm.

According to another aspect of the present invention, there is provided a polymer electrolyte fuel cell including the polymer electrolyte membrane for a fuel cell.

According to another aspect of the present invention, there is provided a method for preparing an antioxidant for a polymer electrolyte membrane of a fuel cell, including (a) adding phosphoric acid (6 M $H_3PO_4$) to an acid solution of a cerium (Ce) precursor and (b) adding water to the product of step (a) to obtain a solution of cerium hydrogen phosphate ($CeHPO_4$) nanofibers.

The method may further include (c) washing, filtering, and drying the solution of cerium hydrogen phosphate ($CeHPO_4$) nanofibers after step (b).

According to another aspect of the present invention, there is provided a method for producing a polymer electrolyte membrane for a fuel cell, including the method for preparing an antioxidant for a polymer electrolyte membrane of a fuel cell.

The method for producing a polymer electrolyte membrane for a fuel cell may include mixing a polymer dispersion for a polymer electrolyte and cerium hydrogen phosphate ($CeHPO_4$) nanofibers with an organic solvent and casting the solution.

The polymer may be dispersed at a concentration of 5 to 45 wt % in the polymer dispersion.

The method may further include drying the cast solution, followed by heating to 60 to 160° C.

According to yet another aspect of the present invention, there is provided a method for fabricating a fuel cell, including the method for producing a polymer electrolyte membrane for a fuel cell.

The presence of cerium hydrogen phosphate ($CeHPO_4$) as a solid acid in the antioxidant of the present invention enhances the dissolution stability of cerium (Ce) due to the chemical bonding and specific crystal structure of the cerium hydrogen phosphate and allows the crystal structure to contain water ($H_2O$) at 300° C. or less. These characteristics enhance water collection or absorption effect, leading to an increase in proton conductivity. Particularly, the crystal structure of the cerium hydrogen phosphate ($CeHPO_4$) nanofibers is composed of smaller cerium particles than that of cerium oxide ($CeO_2$) and the nanofibers can form water or proton ($H^+$) transfer channels in a strongly acidic environment. The loading of cerium oxide into a fluorinated electrolyte membrane decreases the conductivity of the electrolyte membrane, whereas the antioxidant of the present invention does not induce a reduction in the conductivity of the electrolyte membrane due to the presence of cerium hydrogen phosphate ($CeHPO_4$) nanofibers. The presence of small cerium particles with large specific surface area in the antioxidant of the present invention maximizes the ability of the antioxidant to prevent oxidation of the electrolyte membrane. In addition, since the antioxidant of the present invention is a solid acid that is highly miscible in a strongly acidic polymer solution, it can be dispersed to a high degree without the need for a special dispersant or additive.

Furthermore, the fuel cell of the present invention, which employs an electrolyte membrane in which the antioxidant is dispersed, has excellent output characteristics and can stably operate over a wide range of current densities.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
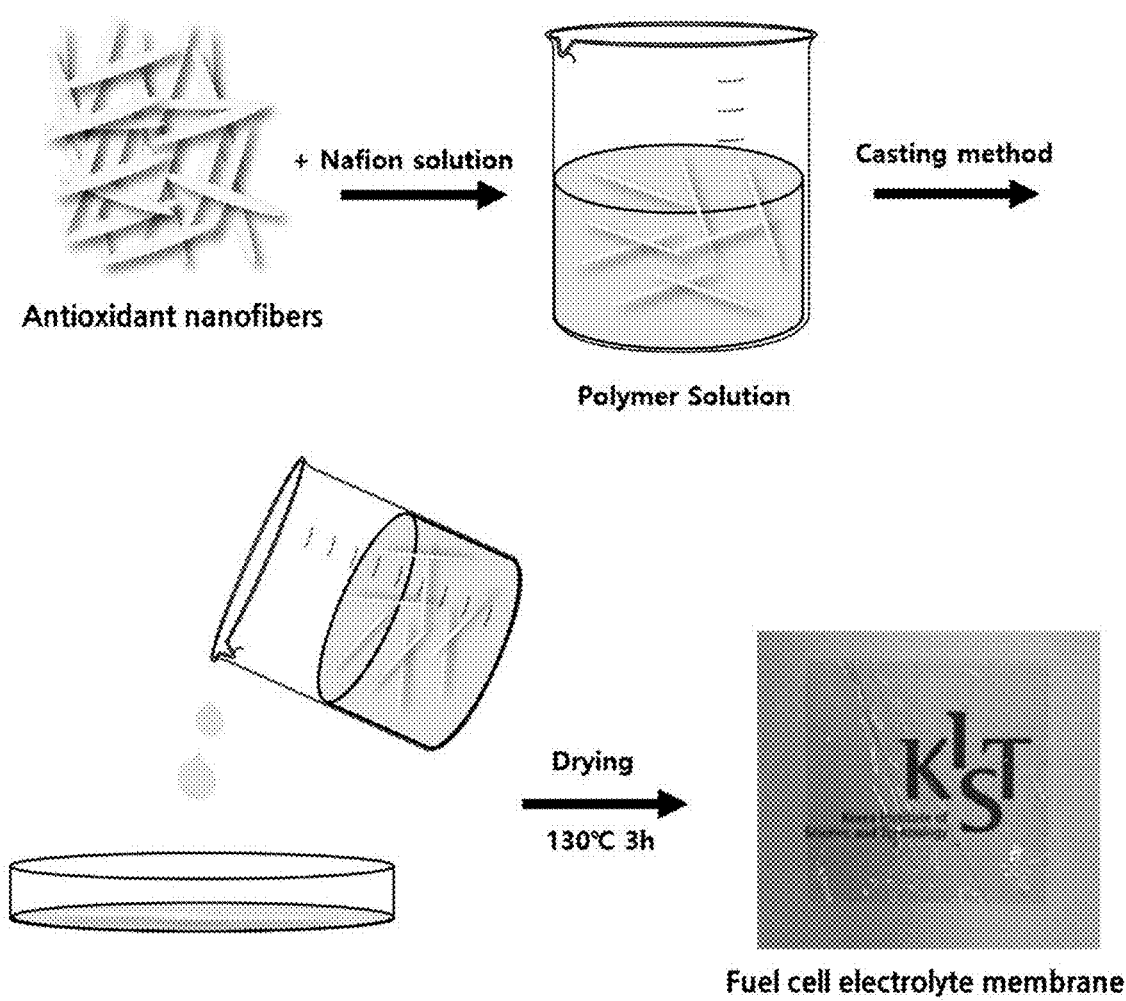
FIG. 1 schematically shows a process of Example 3.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, detailed explanations of related art are omitted when it is deemed that they may unnecessarily obscure the essence of the present invention.

A description will be given regarding an antioxidant for a polymer electrolyte membrane of a fuel cell according to the present invention.

The present invention provides an antioxidant for a polymer electrolyte membrane of a fuel cell including cerium hydrogen phosphate ($CeHPO_4$).

The antioxidant is a radical scavenger.

In a typical fuel cell, hydrogen and oxygen in air as reactant gases crossover through an electrolyte membrane to promote the production of hydrogen peroxide (HOOH). The hydrogen peroxide produces oxygen-containing radicals such as hydroxyl (OH) and hydroperoxyl (OOH) radicals. These radicals attack the perfluorosulfonated electrolyte membrane to cause chemical degradation of the membrane, resulting in poor durability of the fuel cell. The antioxidant of the present invention can protect the electrolyte membrane from damage due to its ability to scavenge the radicals.

The cerium hydrogen phosphate ($CeHPO_4$) is a solid acid.

The cerium hydrogen phosphate ($CeHPO_4$) is in the form of nanofibers.

The nanofibers have a diameter ranging from 10 to 900 nm, preferably 100 to 500 nm, more preferably 150 to 350 nm. However, the diameter of the nanofibers is not limited to this range as long as the morphology of the nanofibers is maintained.

The antioxidant may be used for a fluorinated polymer electrolyte membrane, preferably a perfluorosulfonated ionomer electrolyte membrane. Conventional cerium oxide antioxidants added to perfluorosulfonated ionomer electrolyte membranes react with sulfonic acid groups of the electrolyte membranes to decrease the proton conductivity of the electrolyte membranes, resulting in a reduction in the output of fuel cells employing the electrolyte membranes. In contrast, the antioxidant of the present invention does not cause a reduction in proton conductivity to prevent the output of a fuel cell from deteriorating.

The present invention also provides a polymer electrolyte membrane for a fuel cell including the antioxidant.

The polymer electrolyte membrane of the present invention includes a polymer electrolyte membrane and an antioxidant including cerium hydrogen phosphate ($CeHPO_4$) dispersed in the polymer electrolyte membrane.

The antioxidant is the same as that described above and the same description applies to the polymer electrolyte membrane of the present invention.

The present invention also provides a polymer electrolyte fuel cell including the polymer electrolyte membrane.

The present invention also provides a method for preparing an antioxidant for a polymer electrolyte membrane of a fuel cell.

First, phosphoric acid (6 M $H_3PO_4$) is added to an acid solution of a cerium (Ce) precursor (step (a)).

Preferably, the cerium (Ce) precursor is a cerium sulfate, nitrate or ammonium nitrate and the acid solution is an aqueous solution of sulfuric acid, nitric acid or phosphoric acid. More preferably, the cerium precursor is a cerium sulfate and the acid solution is an aqueous phosphoric acid solution.

After addition of the phosphoric acid, the resulting mixture is preferably stirred.

Next, water is added to the product of step (a) to obtain a solution of cerium hydrogen phosphate (CeHPO$_4$) nanofibers (step (b)).

Thereafter, the solution of cerium hydrogen phosphate (CeHPO$_4$) nanofibers is washed, filtered, and dried after step (b) (step (c)).

The solution of cerium hydrogen phosphate nanofibers can be used as an antioxidant. Preferably, the powder of cerium hydrogen phosphate nanofibers is used as an antioxidant.

The present invention also provides a method for producing a polymer electrolyte membrane for a fuel cell.

Specifically, the method includes mixing a polymer dispersion for a polymer electrolyte and cerium hydrogen phosphate (CeHPO$_4$) nanofibers with an organic solvent and casting the solution.

The polymer may be dispersed at a concentration of 5 to 45 wt %, more preferably 7 to 20 wt %, even more preferably 10 to 20 wt %, in the polymer dispersion.

The method may further include drying the cast solution, followed by heating. The heating temperature is preferably in the range of 60 to 160° C., more preferably 80 to 150° C., even more preferably 120 to 140° C. Outside this temperature range, the durability of the electrolyte membrane may deteriorate.

The solution of cerium hydrogen phosphate (CeHPO$_4$) nanofibers after step (b) may be used to produce the polymer electrolyte membrane. Preferably, the powder of cerium hydrogen phosphate (CeHPO$_4$) nanofibers after step (c) is used to produce the polymer electrolyte membrane. The use of the powder of cerium hydrogen phosphate nanofibers can further improve the proton conductivity and durability of the electrolyte membrane.

Particularly, although not explicitly described in the Examples section that follows, polymer electrolyte membranes for fuel cells were produced by varying the conditions defined in the method for preparing an antioxidant for a polymer electrolyte membrane of a fuel cell and the method for producing a polymer electrolyte membrane of a fuel cell according to the present invention: the kind of the cerium (Ce) precursor, the kind of the acid solution, the concentration of the cerium precursor in the acid solution, the reaction temperature of step (a), the reaction temperature of step (b), the shape of the cerium hydrogen phosphate nanofibers, the kind of the polymer for a polymer electrolyte, the concentration of the polymer dispersion, the mixing time of the polymer dispersion and the cerium hydrogen phosphate, and the heating temperature after casting; and the proton conductivities and durability of the polymer electrolyte membranes were investigated. As a result, when the following conditions were all met, the polymer electrolyte membranes were found to have high proton conductivities and good durability, unlike when other conditions were employed: the cerium (Ce) precursor is (CeSO$_4$)$_2$.4H$_2$O, Ce(NO$_3$)$_3$.6H$_2$O or (NH$_4$)$_2$Ce(NO$_3$)$_6$, the acid solution is a 0.45 to 0.55 M H$_2$SO$_4$ solution, the concentration of the cerium precursor in the acid solution is from 0.04 to 0.06 M, the reaction temperature of step (a) is from 70 to 90° C., the reaction temperature of step (b) is from 50 to 70° C., the cerium hydrogen phosphate nanofibers are formed in a film shape after washing and drying, the polymer is Nafion, the polymer dispersion has a concentration of 10 to 20 wt %, the mixing time of the polymer dispersion and the cerium hydrogen phosphate is from 10 to 20 hours, and the heating temperature after casting is from 120 to 140° C.

The following examples are provided to assist in further understanding of the present invention. However, these examples are provided for illustrative purposes only and the scope of the present invention is not limited thereto. It will be evident to those skilled in the art that various modifications and changes can be made without departing from the scope and spirit of the present invention.

EXAMPLES

Example 1: Preparation of Cerium Hydrogen Phosphate (CeHPO$_4$) Nanofibers for Antioxidant 20 ml of a 6 M H$_3$PO$_4$ was dropwise added to 20 ml of a 0.5 M H$_2$SO$_4$ solution of 0.05 M (CeSO$_4$)$_2$.4H$_2$O with stirring at 80° C. The mixture was digested while maintaining the temperature at 80° C. 200 ml of hot D.I water at ~60° C. was added and stirred for 1 h. Thereafter, the resulting mixture was washed with D.I water until a pH of 3 was attained, filtered, and dried in air at room temperature to prepare a powder of cerium hydrogen phosphate (CeHPO$_4$) nanofibers.

Example 2: Preparation of Cerium Hydrogen Phosphate (CeHPO$_4$) Nanofibers for Antioxidant A solution of cerium hydrogen phosphate (CeHPO$_4$) nanofibers was prepared in the same manner as in Example 1, except that the final drying step was omitted.

Example 3: Production of Antioxidant-Loaded Fluorinated Electrolyte Membrane 7.2 g of ethanol and 2.8 g of propanol were added to 0.1 g of the powder of cerium hydrogen phosphate (CeHPO$_4$) nanofibers prepared in Example 1 in 10 g of a dispersion of 20 wt % of Nafion (DuPont) in a solvent mixture (1-propane, ethanol, distilled water, and VOCs) and mixed with a stirring bar for 12 h. The well-dispersed antioxidant solution was cast to produce a fluorinated polymer electrolyte membrane. The electrolyte membrane was dried at 60° C. and heated at 130° C. for 3 h.

The process of Example 3 is schematically shown in FIG. 1.

Example 4: Production of Antioxidant-Loaded Fluorinated Electrolyte Membrane

An electrolyte membrane was produced in the same manner as in Example 3, except that 6.7 g of the solution of cerium hydrogen phosphate nanofibers (estimated weight of the nanofibers=0.1 g) prepared in Example 2 was used instead of the powder of cerium hydrogen phosphate (CeHPO$_4$) nanofibers prepared in Example 1.

Comparative Example 1: Production of Fluorinated Electrolyte Membrane Unloaded with Antioxidant An electrolyte membrane was produced in the same manner as in Example 3, except that the cerium hydrogen phosphate nanofibers were not used.

Comparative Example 2: Production of Fluorinated Electrolyte Membrane Loaded with Cerium Oxide (CeO$_2$) Antioxidant An electrolyte membrane was produced in the same manner as in Example 3, except that 0.1 g of cerium oxide (CeO$_2$) was used instead of the cerium hydrogen phosphate nanofibers.

EXPERIMENTAL EXAMPLES

Figure 2:
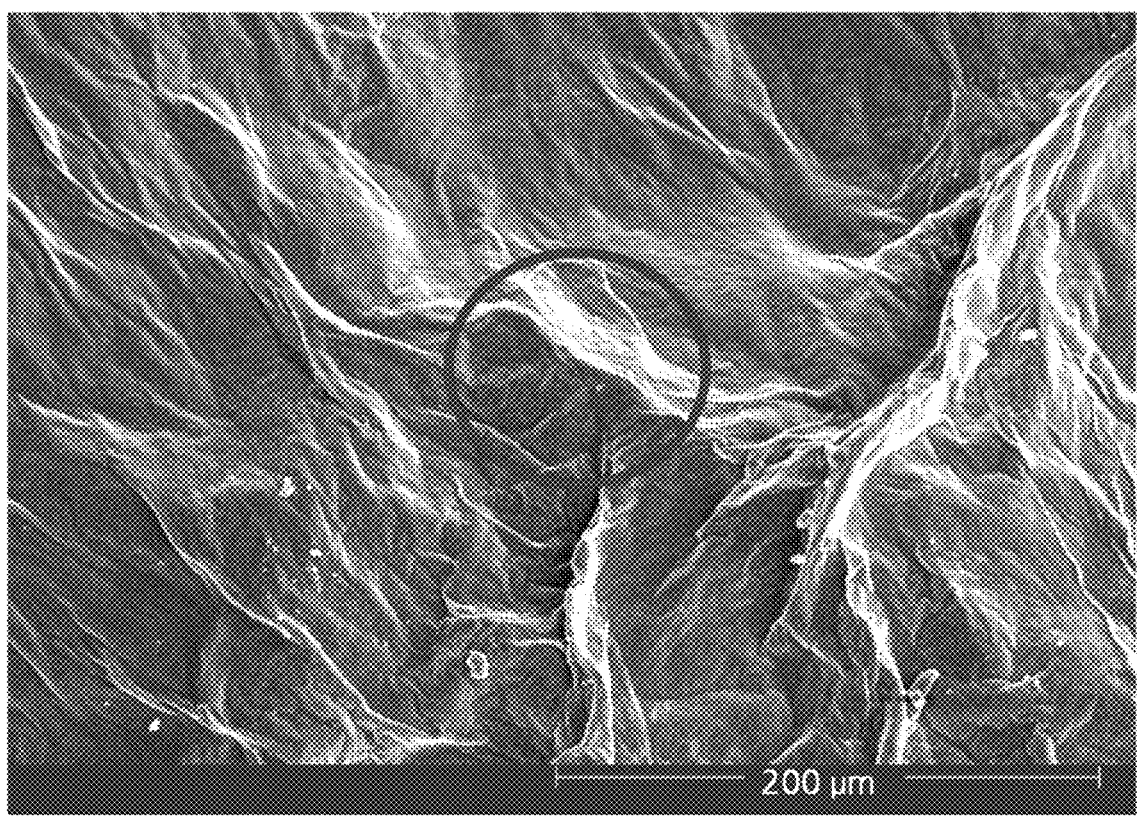
FIG. 2 is a SEM image of a cerium hydrogen phosphate ($CeHPO_4$) powder prepared in Example 1.
Figure 3A:
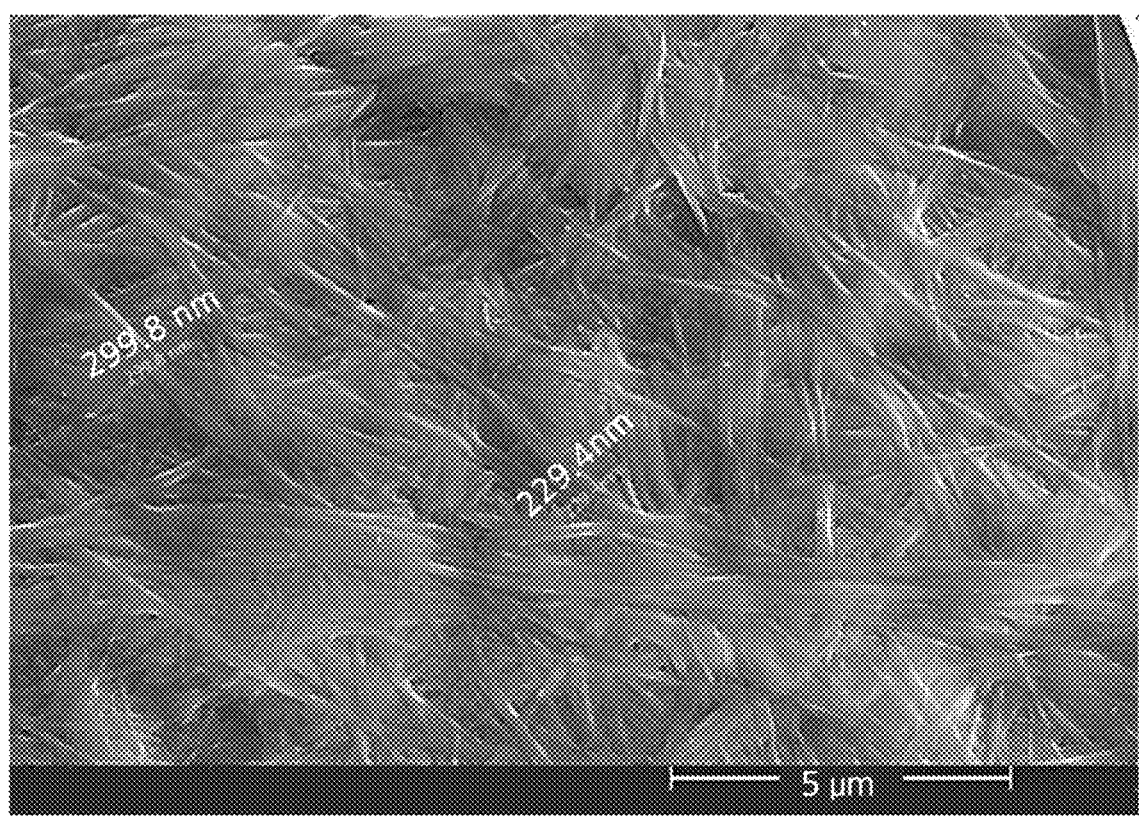
FIGS. 3A and 3B show magnified images of the area indicated by the circle in FIG. 2.
Figure 3B:
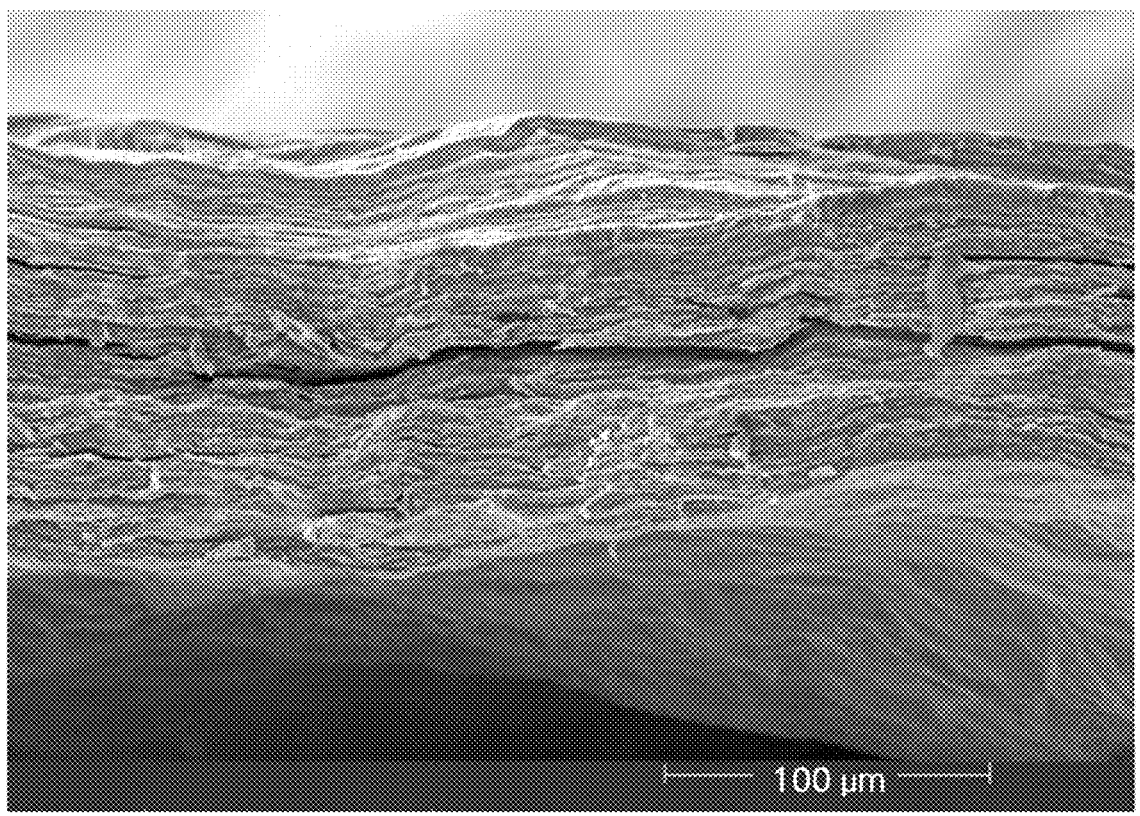

Experimental Example 1: Analysis of SEM Images and XRD Analysis for the Ce Phosphate Nanofibers FIG. 2 is a SEM image of the cerium hydrogen phosphate ($CeHPO_4$) powder prepared in Example 1 (scale bar=200 μm). FIGS. 3A and 3B show magnified surface (scale bar=500 μm) and cross-sectional images of the area indicated by the circle in FIG. 2, respectively. These images reveal that the nanofibers had a diameter of ~50-300 nm.

Figure 4:
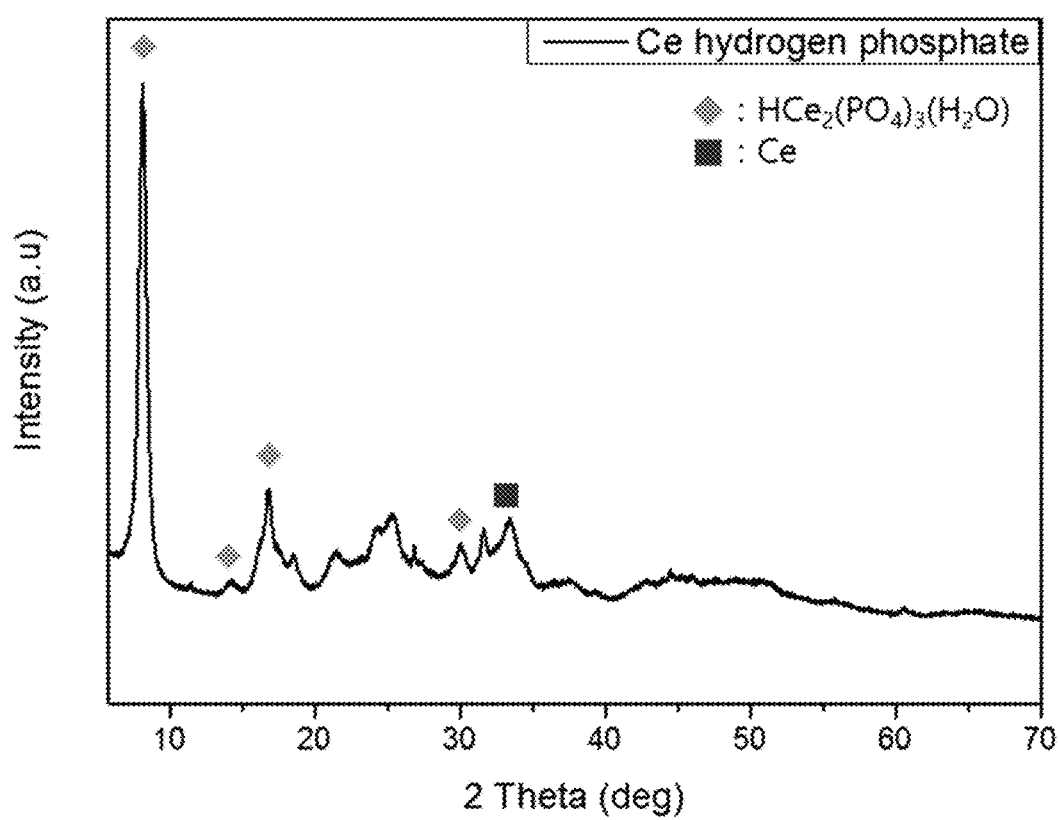
FIG. 4 shows the results of XRD analysis for a cerium hydrogen phosphate ($CeHPO_4$) powder prepared in Example 1.

FIG. 4 shows the results of XRD analysis for the cerium hydrogen phosphate ($CeHPO_4$) powder prepared in Example 1. The diffraction peaks of the powder were in agreement with those of $HCe_2(PO_4)_3(H_2O)$ and Ce crystals.

Experimental Example 2: Measurement of Proton Conductivities and Fluoride Release Rates (FRRs)

Each of the electrolyte membranes produced in Examples 3 and 4 and Comparative Examples 1 and 2 was dried in an oven at 80° C. for 6 h, weighed, and maintained under Fenton test conditions (2 wt % hydrogen peroxide+deionized water+3 ppm $Fe^{2+}$) at 80° C. for 120 h. The fluoride release rate (FRR) of the electrolyte membrane was calculated.

The proton conductivity of the electrolyte membrane was measured using an impedance analyzer (Solartron 1260, Solartron Analytical Co., UK) and an interface (Solartron 1287, Solartron Analytical Co., UK) at 65° C. and 50% RH.

Figure 5:
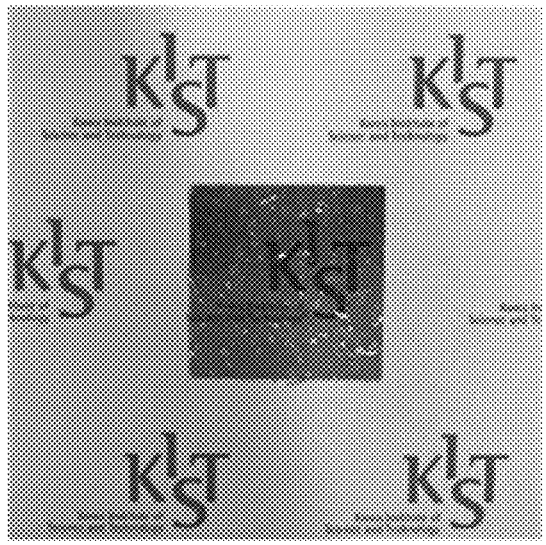
FIG. 5 shows images of electrolyte membranes produced in Examples 3 and 4 and Comparative Examples 1 and 2.
Figure 5:
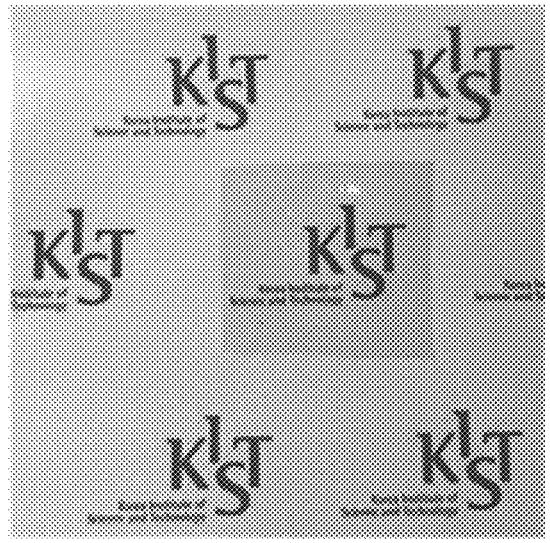
Figure 5:
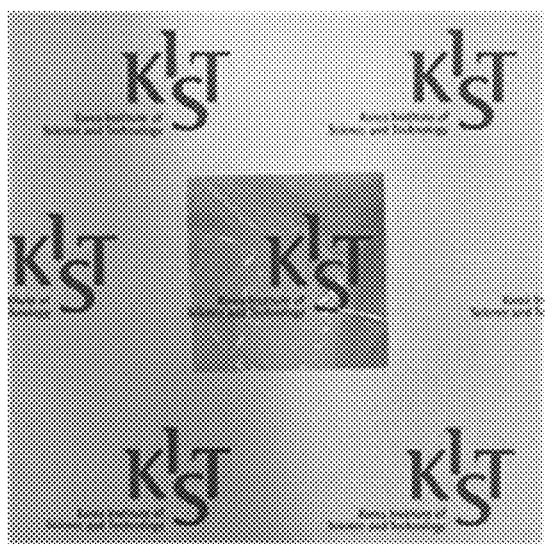
Figure 5:

The results are summarized in Table 1. Images of the electrolyte membranes produced in Examples 3 and 4 and Comparative Examples 1 and 2 are shown in FIG. 5.

TABLE 1

| Properties | Comparative Example 1 | Comparative Example 2 | Example 3 | Example 4 |
|---|---|---|---|---|
| FRR (μmol/hr · g) | 2.82 | 2.01 | 0.535 | 1.87 |
| Proton conductivity (mS/cm) | 22.9 | 24.3 | 28.2 | 26.2 |
| Membrane thickness (μm) | 25 | 25 | 25 | 25 |

The fluoride release rates of the antioxidant-containing electrolyte membranes produced in Examples 3 and 4 were measured to be lower than those of the electrolyte membranes produced in Comparative Examples 1 and 2 including no antioxidant. Particularly, the fluoride release rate of the electrolyte membrane containing the powder of cerium hydrogen phosphate ($CeHPO_4$) nanofibers (Example 3) was at least 3-fold lower than that of the electrolyte membrane containing the solution of cerium hydrogen phosphate ($CeHPO_4$) nanofibers (Example 4), indicating much better antioxidant effect of the electrolyte membrane of Example 3.

The proton conductivities of the antioxidant-containing electrolyte membranes produced in Examples 3 and 4 were found to be higher than those of the electrolyte membranes produced in Comparative Examples 1 and 2. Particularly, the electrolyte membrane containing the powder of cerium hydrogen phosphate nanofibers (Example 3) showed the highest proton conductivity.

Although the present invention has been described herein with reference to the foregoing embodiments, those skilled in the art will appreciate that various changes and modifications are possible by addition, modification, deletion or insertion of the elements without departing from the spirit of the present invention as disclosed in the accompanying claims. It is to be understood that such changes and modifications are within the scope of the present invention.

What is claimed is:

1. An antioxidant for a polymer electrolyte membrane of a fuel cell, the antioxidant comprising cerium hydrogen phosphate ($CeHPO_4$).

2. The antioxidant according to claim 1, wherein the antioxidant is a radical scavenger.

3. The antioxidant according to claim 1, wherein the cerium hydrogen phosphate ($CeHPO_4$) is a solid acid.

4. The antioxidant according to claim 3, wherein the cerium hydrogen phosphate ($CeHPO_4$) forms cerium hydrogen phosphate ($CeHPO_4$) nanofibers.

5. The antioxidant according to claim 4, wherein the nanofibers have a diameter of 10 to 900 nm.

6. The antioxidant according to claim 1, wherein the antioxidant is used for a fluorinated polymer electrolyte membrane.

7. The antioxidant according to claim 6, wherein the fluorinated polymer electrolyte membrane is a perfluorosulfonated ionomer electrolyte membrane.

8. A polymer electrolyte membrane for a fuel cell comprising a polymer electrolyte membrane and an antioxidant comprising cerium hydrogen phosphate ($CeHPO_4$) dispersed in the polymer electrolyte membrane.

9. The polymer electrolyte membrane according to claim 8, wherein the antioxidant is a radical scavenger.

10. The polymer electrolyte membrane according to claim 8, wherein the cerium hydrogen phosphate ($CeHPO_4$) is a solid acid.

11. The antioxidant according to claim 8, wherein the cerium hydrogen phosphate ($CeHPO_4$) forms cerium hydrogen phosphate ($CeHPO_4$) nanofibers.

12. The polymer electrolyte membrane according to claim 11, wherein the nanofibers have a diameter of 10 to 900 nm.

13. A polymer electrolyte fuel cell comprising the polymer electrolyte membrane according to claim 8.

* * * * *